(12) United States Patent
Catalfano et al.

(10) Patent No.: US 7,743,159 B2
(45) Date of Patent: Jun. 22, 2010

(54) REUSABLE APPLICATION FRAMEWORK FOR TRANSLATING BETWEEN A CLIENT AND AN EXTERNAL ENTITY

(75) Inventors: Anthony Francis Catalfano, Davenport, IA (US); William Robert Norris, Rock Hill, SC (US)

(73) Assignee: Deere & Company, Moline, IL (US)

( * ) Notice: Subject to any disclaimer, the term of this patent is extended or adjusted under 35 U.S.C. 154(b) by 820 days.

(21) Appl. No.: 11/626,426

(22) Filed: Jan. 24, 2007

(65) Prior Publication Data
US 2008/0177888 A1    Jul. 24, 2008

(51) Int. Cl.
*G06F 15/16* (2006.01)
(52) U.S. Cl. .................. 709/230; 709/232
(58) Field of Classification Search ............. 709/230, 709/232
See application file for complete search history.

(56) References Cited

U.S. PATENT DOCUMENTS

| | | | |
|---|---|---|---|
| 6,917,969 B2 * | 7/2005 | Aggarwal et al. | 709/219 |
| 6,964,055 B2 * | 11/2005 | Hanses et al. | 719/328 |
| 7,343,428 B2 * | 3/2008 | Fletcher et al. | 709/250 |

* cited by examiner

*Primary Examiner*—Andy Ho
(74) *Attorney, Agent, or Firm*—Taylor & Aust, P.C.

(57) ABSTRACT

A reusable application framework for translating between a client and an external entity negotiates a first communication protocol with the client, receives an input request from the client, and parses the input request to extract client type and use case identifications. An application object module is configured for transferring the input request. A data mapper module is configured to extract input data from input requests having the client type identification, and maps the input data to an input bean. A use case handler module specific to at least one predefined task associated with the external entity receives the input bean. A broker module is configured to communicate with the external entity using a second communication protocol and inserts the input bean into a data stream of the second communication protocol for transfer to the external entity.

20 Claims, 4 Drawing Sheets

REUSABLE APPLICATION FRAMEWORK FOR TRANSLATING BETWEEN A CLIENT AND AN EXTERNAL ENTITY

FIELD OF THE INVENTION

The present invention relates to electronic communication between two or more devices, and more particularly, to a reusable application framework for translating between a client and an external entity.

BACKGROUND OF THE INVENTION

Software engineers are constantly writing and rewriting code to accommodate similar devices of similar function, but which communicate using different communication protocols. One example of such devices is various types of displays.

What is needed in the art is a reusable application framework for translating between different communication protocols.

SUMMARY OF THE INVENTION

The present invention provides a reusable application framework for translating between different communication protocols. The application framework may be used, for example, as a common template in initial software development in a control/data acquisition scenario, and the application framework may be used in expanding the initial system in an orderly and predicable manner.

The invention, in one form thereof, is directed to a reusable application framework for translating between a client and an external entity, the client and the external entity being incapable of direct communications. A connection module is configured for negotiating a first communication protocol with the client. The connection module is configured to receive an input request from the client using the first communication protocol, and configured to parse the input request to extract a client type identification and a use case identification. An application object module is specific to both of the client type identification and the use case identification. The application object module is coupled to the connection module and is configured for transferring the input request. A data mapper module is specific to the client type identification. The data mapper module is coupled to the application object module. The data mapper module is configured to extract input data from input requests having the client type identification, and is configured to map the input data to an input bean of a predetermined data format. A use case handler module is specific to at least one predefined task associated with the external entity. The use case handler module is coupled to the application object module and is configured to receive the input bean. A broker module is configured to communicate with the external entity using a second communication protocol compatible with the external entity. The broker module is coupled to the use case handler module and is configured to receive the input bean from the use case handler module and insert the input bean into a data stream of the second communication protocol for transfer to the external entity.

The invention, in another form thereof, is directed to a reusable application framework for translating between a client and a external entity, wherein the client communicates using a first communication protocol and the external entity communicates using a second communication protocol different from the first communication protocol. A first connection module is coupled to the client. The first connection module receives an input request from the client and parses the request to extract a first client type identification and a first use case identification. An application object module collection has a plurality of application object modules. The application object module collection is coupled to the first connection module. An application object collection manager module is coupled to the first connection module and to the application object module collection. The application object collection manager module is configured to select a first application object module of the plurality of application object modules based on the client type identification and the use case identification. A data mapper module collection includes a plurality of data mapper modules. The data mapper module collection is coupled to the application object module collection. Each data mapper module of the plurality of data mapper modules is configured to extract input data from input requests having a particular client type identification, and is configured to map the input data from the particular client type to an input bean of a common data representation. A data mapper collection manager module is coupled to the data mapper module collection. The data mapper collection manager module is configured to select a first data mapper module of the plurality of data mapper modules based on the client type identification and the use case identification. A use case handler module collection includes a plurality of use case handler modules. The use case handler module collection is coupled to the application object module collection. Each use case handler module is coupled to a particular data mapper module having the same client type identification. Each use case handler module is specific to at least one predefined task associated with the external entity. A use case collection manager module is coupled to the application object module collection and to the use case handler module collection. The use case collection manager module is configured to select a first use case handler module of the plurality of use case handler modules based on the use case identification without regard to the client type identification. The first use case handler module is specific to a first task associated with the external entity. The first use case handler module is coupled to the first data mapper module. The first use case handler module is configured to receive the input bean. A first broker module specific to the first use case handler module is configured to communicate with the external entity using the second communication protocol. The first broker module is coupled to the first use case handler module and is configured to receive the input bean from the first use case handler module and forward the input bean to the external entity using the second communication protocol.

The invention, in another form thereof, is directed to a method for establishing a communication translation interface for translating between a client and an external entity using a reusable application framework. The method includes providing each of an application object module collection having a plurality of application object modules, a data mapper module collection including a plurality of data mapper modules, and a use case handler module collection including a plurality of use case handler modules; negotiating a first communication protocol with the client using a connection module, the connection module being configured to receive an input request from the client using the first communication protocol, and configured to parse the input request to extract a client type identification and a use case identification; selecting an application object module from the application object module collection that is specific to both of the client type identification and the use case identification, the application object module being coupled to the connection module and being configured for transferring the input request; selecting a data mapper module from the data mapper module collection that is specific to the client type identification, the data mapper module being coupled to the application object module, the data mapper module being configured to extract input data from input requests having the client type identification, and being configured to map the input data to an input bean of a predetermined data format; selecting a use case handler module from the use case handler module collection that is specific to at least one predefined task associated with the external entity, the use case handler module being configured to receive the input bean; and using a broker module specific to the selected use case handler module to communicate with the external entity using a second communication protocol compatible with the external entity, wherein the broker module is configured to receive the input bean from the use case handler module and insert the input bean into a data stream of the second communication protocol for transfer to the external entity.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications not to be construed as limiting the scope of the invention in any manner.

DETAILED DESCRIPTION OF THE INVENTION

Figure 1:
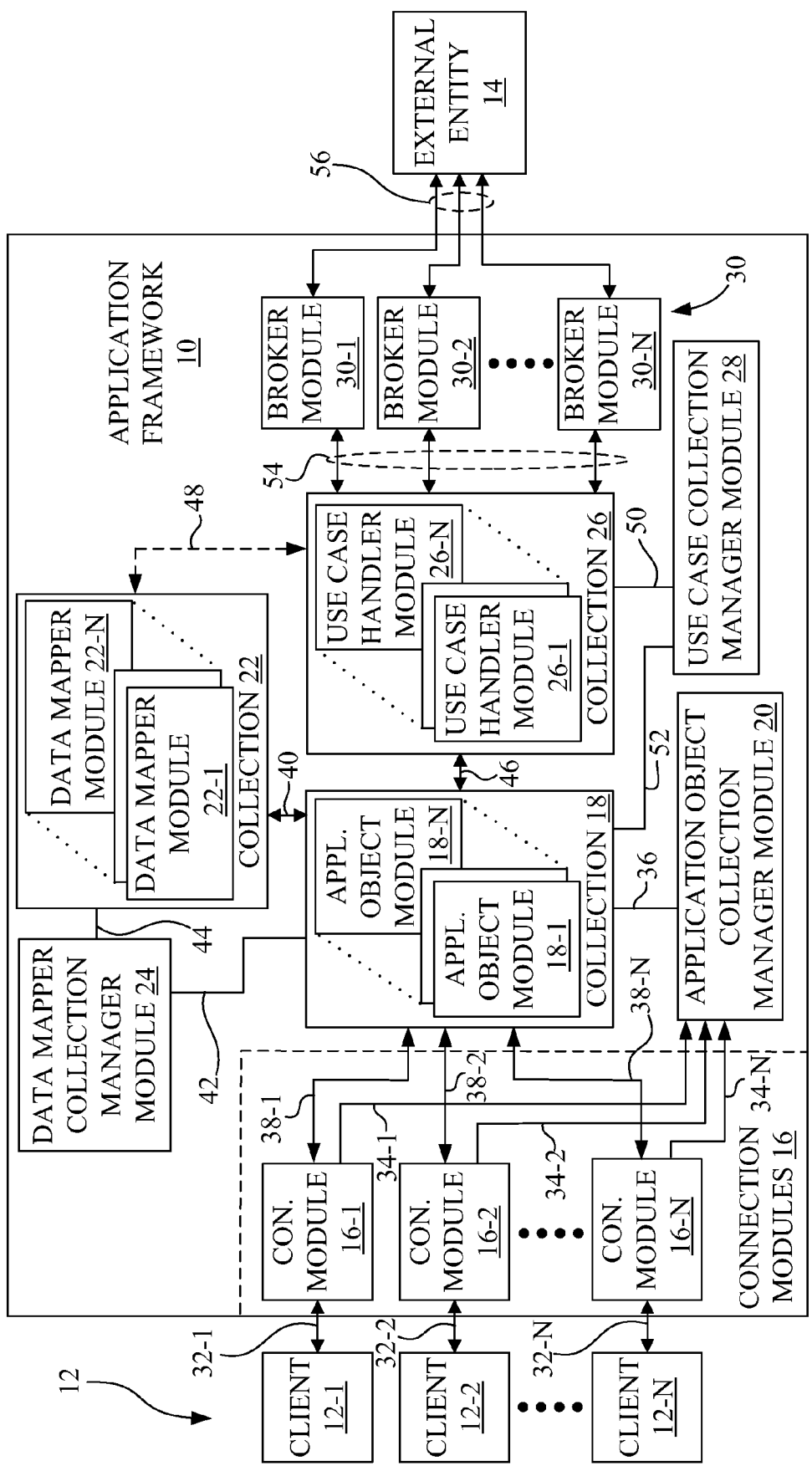
FIG. 1 is a diagrammatic illustration of a reusable application framework in accordance with an embodiment of the present invention.

Referring now to the drawings and particularly to FIG. 1, there is shown a reusable application framework 10 for translating between one or more clients 12 and an external entity 14, where client(s) 12 and external entity 14 are incapable of direct communications due to incompatibility between their respective communication protocols. Clients 12 are individually identified as 12-1, 12-2 . . . 12-N. It is to be understood that the reusable application framework 10 may be replicated to accommodate additional external entities.

Figure 2:
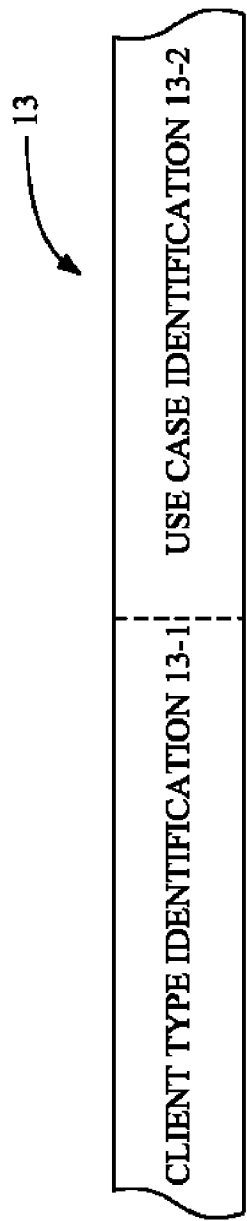
FIG. 2 is a diagrammatic representation of a data stream including client type identification and use case identification.

As used herein, the term "client" refers to a device that may be implemented in hardware and/or software that communicates by way of a data stream in a first communication protocol. The data stream may be in a packetized format. As illustrated in FIG. 2, an exemplary data stream 13 includes for example, client type identification 13-1 and use case identification 13-2, and in addition, may include control instructions, and data. The client will direct, and/or be the beneficiary of, tasks to be performed by the external entity. The client is physically coupled to the reusable application framework 10. Each of client(s) 12 may be, for example, an input/output (I/O) device (e.g., a computer with monitor running associated software, e.g., a browser; touch screen display; cell phone; a gaming controller; etc.), a simple display, or a simple input device (e.g., keyboard, mouse, joy stick, etc.).

As used herein, the term "external entity" refers to a device that may be implemented in hardware and/or software that communicates by way of a data stream in a second communication protocol, different from the first communication protocol used by a client. The data stream may be in a packetized format, and may include for example, client identification information, feedback data, status information, etc. The external entity will perform tasks for the benefit of and/or at the directive of a client. The external entity is physically coupled to the reusable application framework 10. External entity 14 may be, for example, a remotely controlled device (such as a remotely controlled vehicle, a robotic system, a robotic sub-system, a weapons system, etc.) or an information device, such as a global positioning system (GPS) device.

In the Figures, double headed arrows between blocks are used to generally designate communications links that are primarily data flow channels, and non-arrowed lines between blocks are used to generally designate communications links that are primarily selection channels. Also, each line that represents a communications link may further represent one or more communication channels between blocks, since it is possible with the invention to have multiple communication channels open simultaneously between blocks, as will become more apparent in the discussion of the examples further below. The term "communications link" is used to generally refer to structure that facilitates electronic communication between multiple blocks (e.g., components), and may operate using wired and/or wireless technology, and/or software.

Reusable application framework 10 may include a plurality of connection modules 16 (individually identified as connection module 16-1, 16-2 . . . 16-N), an application object module collection 18, an application object collection manager module 20, a data mapper module collection 22, a data mapper collection manager module 24, a use case handler module collection 26, a use case collection manager module 28, and a plurality of broker modules 30 (individually identified as broker module 30-1, 30-2 . . . 30-N). Individual application object modules of the application object module collection 18 are identified as 18-1, 18-2 . . . 18-N. Individual data mapper modules of the data mapper module collection 22 are identified as 22-1, 22-2 . . . 22-N. Individual use case handler modules of use case handler module collection 26 are identified as 26-1, 26-2 . . . 26-N.

The variable "N" is used herein for convenience to represent a variable quantity of a particular type of module or item, and it is to be understood that as between various modules and items, the common use of the variable "N" does not necessarily mean a corresponding equal quantity. For example, for a given application framework 10, N may be equal to three in the context of the number of clients 12-N currently connected to application framework 10, whereas N may be equal to 25 in the context of data mapper module 22-N.

Each of clients 12-1, 12-2 . . . 12-N is communicatively coupled to a respective one of connection modules 16-1, 16-2 . . . 16-N by a respective communications link 32-1, 32-2 . . . 32-N. Each of connection module 16-1, 16-2 . . . 16-N is configured for negotiating the respective communication protocol with the respective client 12-1, 12-2 ... 12-N. For example, the communication protocol negotiated for communication between client 12-1 and connection module 16-1 may be Hyper Text Transfer Protocol (HTTP), wherein client 12-1 is a display device. Other protocols may be, for example, User Datagram Protocol (UDP) and transmission control protocol (TCP). Each of connection modules 16-1, 16-2, ... 16-N is configured to receive an input request from a respective client 12-1, 12-2, ... 12-N using the respective negotiated communication protocol, and configured to parse the input request to extract a client type identification and a use case identification. Each of connection modules 16-1, 16-2 ... 16-N is communicatively coupled to application object collection manager module 20 by a respective communications link 34-1, 34-2 ... 34-N.

Application object collection manager module 20 is coupled by a communications link 36 to application object module collection 18. Application object collection manager module 20 is configured to select a particular application object module from the plurality of application object modules 18-1, 18-2 ... 18-N of application object module collection 18 for each of clients 12-1, 12-2 ... 12-N based on the client type identification and the use case identification parsed from the respective input request.

An application object module is a module used for manipulating an application. Each of application object modules 18-1, 18-2 ... 18-N is associated with a specific application, such as a GPS application, a vehicle guidance application, a weapons system application, a spreadsheet application, etc. Once a selection is made by application object collection manager module 20, respective communications links 38-1, 38-2 ... 38-N are established between each of connection modules 16-1, 16-2 ... 16-N and a respective selected application object module 18-1, 18-2 ... 18-N.

Application object module collection 18 is communicatively coupled to data mapper module collection 22 via a communications link 40, which may represent multiple communication channels. Application object module collection 18 is coupled by a communications link 42 to data mapper collection manager module 24. Data mapper collection manager module 24 is communicatively coupled by communications link 44 to data mapper module collection 22. Application object module collection 18 is coupled by a communications link 46 to use case handler module collection 26. A communications link 48 provides an alternative path from data mapper module collection 22 to use case handler module collection 26.

Each data mapper module 22-1, 22-2 ... 22-N of data mapper module collection 22 is specific to a particular client type identification, and may be specific to a particular use case identification. For example, data mapper collection manager module 24 may be configured to select a particular respective data mapper module from a plurality of data mapper modules of collection 22 for each application object module 18-1, 18-2 ... 18-N based on the client type identification and the use case identification parsed from a respective input request. Each data mapper module 22-1, 22-2 ... 22-N is configured to extract input data from the respective input request having the particular client type identification recognized by the respective data mapper module 22-1, 22-2, ... 22-N. Also, each data mapper module 22-1, 22-2 ... 22-N is configured to map the respective input data to a respective input bean of a predetermined data format. Further, each data mapper module 22-1, 22-2 ... 22-N is configured to send its respective input bean to a respective application object module 18-1, 18-2 ... 18-N of application object module collection 18 via communications link 40, or alternatively may send its respective input bean directly to a respective use case handler module 26-1, 26-2 ... 26-N of the use case handler module collection 26 via communications link 48.

Each use case handler module 26-1, 26-2 ... 26-N of use case handler module collection 26 is specific to at least one predefined task associated with external entity 14. Such use case tasks may be, for example: get GPS data, send vehicle guidance commands, send weapons system commands, get camera display data, etc. Use case collection manager module 28 is coupled by communications link 50 to each of the plurality of use case handler modules 26-1, 26-2 ... 26-N of use case handler module collection 26. Also, use case collection manager module 28 is coupled by communications link 52 to each of the plurality of application object modules 18-1, 18-2 ... 18-N of application object module collection 18.

Use case collection manager module 28 is configured to select a particular use case handler module from the plurality of use case handler modules 26-1, 26-2 ... 26-N of use case handler collection module 26 for use with a respective application object module 18-1, 18-2 ... 18-N of application object module collection 18 based on the use case identification, without regard to the client type identification. Each use case handler module that is selected is coupled via communications link 46, representing multiple communications paths, to a respective application object module 18-1, 18-2, ... 18-N, and each selected use case handler module is configured to receive the respective input bean from a respective application object module 18-1, 18-2 ... 18-N. Alternatively, the selected use case handler module(s) may receive the input bean directly from a respective data mapper module 22-1, 22-2 ... 22-N.

Each use case handler module 26-1, 26-2 ... 26-N is communicatively coupled by communications link 54, representing multiple communications paths, to a respective broker module 30-1, 30-2 ... 30-N. Each broker module 30-1, 30-2 ... 30-N is specific to a particular use case handler module 26-1, 26-2 ... 26-N. Each broker module 30-1, 30-2 ... 30-N is communicatively coupled by communications link 56, representing multiple communications paths, to external entity 14.

Each broker module 30-1, 30-2 ... 30-N is configured to communicate with external entity 14 using the second communication protocol compatible with external entity 14. Each broker module 30-1, 30-2 ... 30-N is configured to receive the input bean from a respective use case handler module 26-1, 26-2 ... 26-N and insert the input bean into a data stream of the second communication protocol for transfer to external entity 14. External entity 14 then receives the input bean and parses its contents to retrieve information to identify tasks to be performed as set forth in the original input request sent by a respective client 12-1, 12-2 ... 12-N.

In a return path, a respective broker module, e.g., broker module 30-1, is configured to receive output data from external entity 14, wherein the output data is in a data stream of the second communication protocol compatible with external entity 14. The output data will include client type identification and a use case identification, in order to define the path from external entity 14 through application framework 10 to a respective client, e.g., client 12-1. Broker module 30-1 is configured to send the output data to the specified use case handler module, e.g., use case handler module 26-1. Use case handler module 26-1 also is configured to send the output data to the associated data mapper module, e.g., data mapper module 22-1, either directly via communications link 48, or indirectly via a respective application object module, e.g., application object module 18-1 and communications links 40 and 46.

Data mapper module 22-1 is configured to map the output data to an output bean formatted for a particular client, e.g., client 12-1. Data mapper module 22-1 is configured to send the output bean to the use case handler module 26-1, either directly via communications link 48 or indirectly via application object module 18-1 and communications links 40 and 46. Use case handler module 26-1 is configured to send the output bean to the respective application object module, e.g., application object module 18-1. Application object module 18-1 is configured to receive the output bean and forward the output bean to a respective connection module associated with the respective client, e.g., to connection module 16-1 coupled to client 12-1. Connection module 16-1 is configured to insert the output bean into a data stream of the first communication protocol compatible with client 12-1 for transfer to client 12-1.

The return path process as described above may be readily adapted to send particular output data to other clients 12-2 . . . 12-N based on the client identification and use case identification associated with the particular output data.

Figure 3:
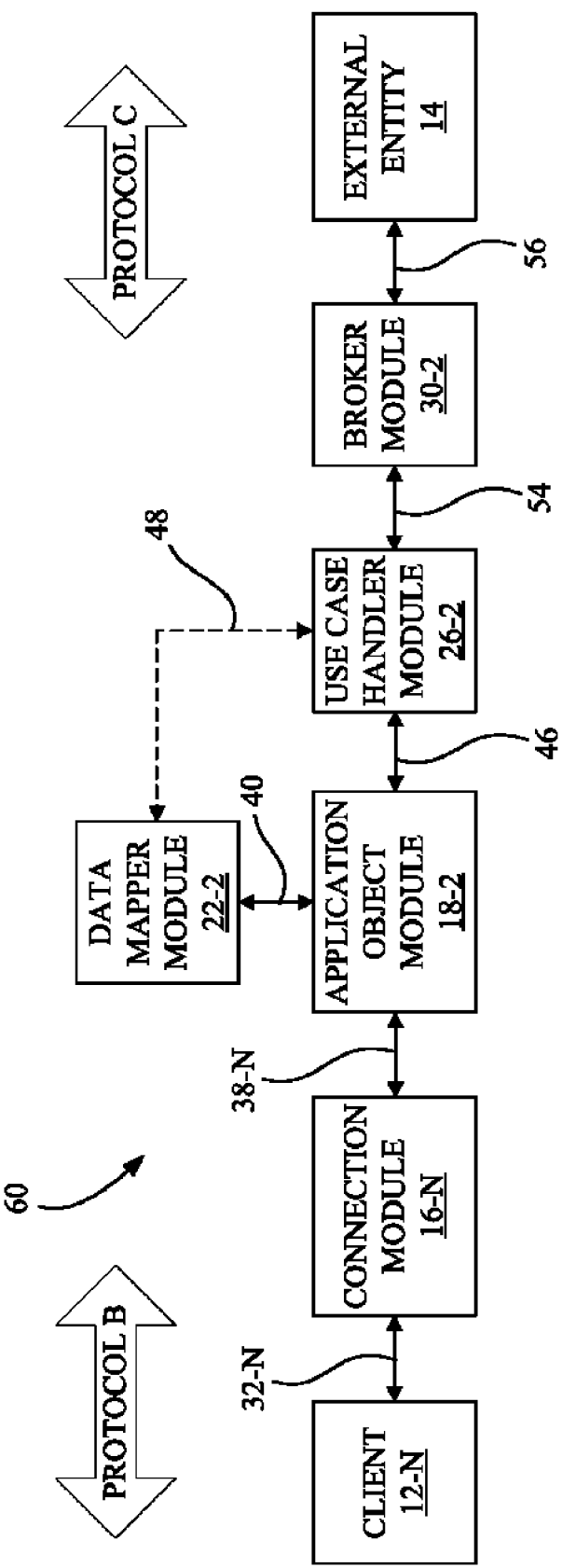
FIG. 3 is a diagrammatic representation of an exemplary configuration of a communication translation interface generated from the application framework of FIG. 1.

FIG. 3 is an exemplary configuration of a communication translation interface 60 generated from application framework 10 after being configured based on the client type identification and use case identification supplied by a single client, which in this example is client 12-N. In this example, assume a scenario wherein a previous client 12-2 in the form of a display configured to communicate using protocol A has failed, and the only suitable replacement is client 12-N in the form of a display configured to communicate using protocol B, e.g., HTML. Also, in this example, external entity 14 will be a remote control vehicle having GPS data retrieval capabilities. The goal in this example will be to retrieve GPS data from external entity 14, and provide the GPS data for display on the display represented by client 12-N.

Figure 4:
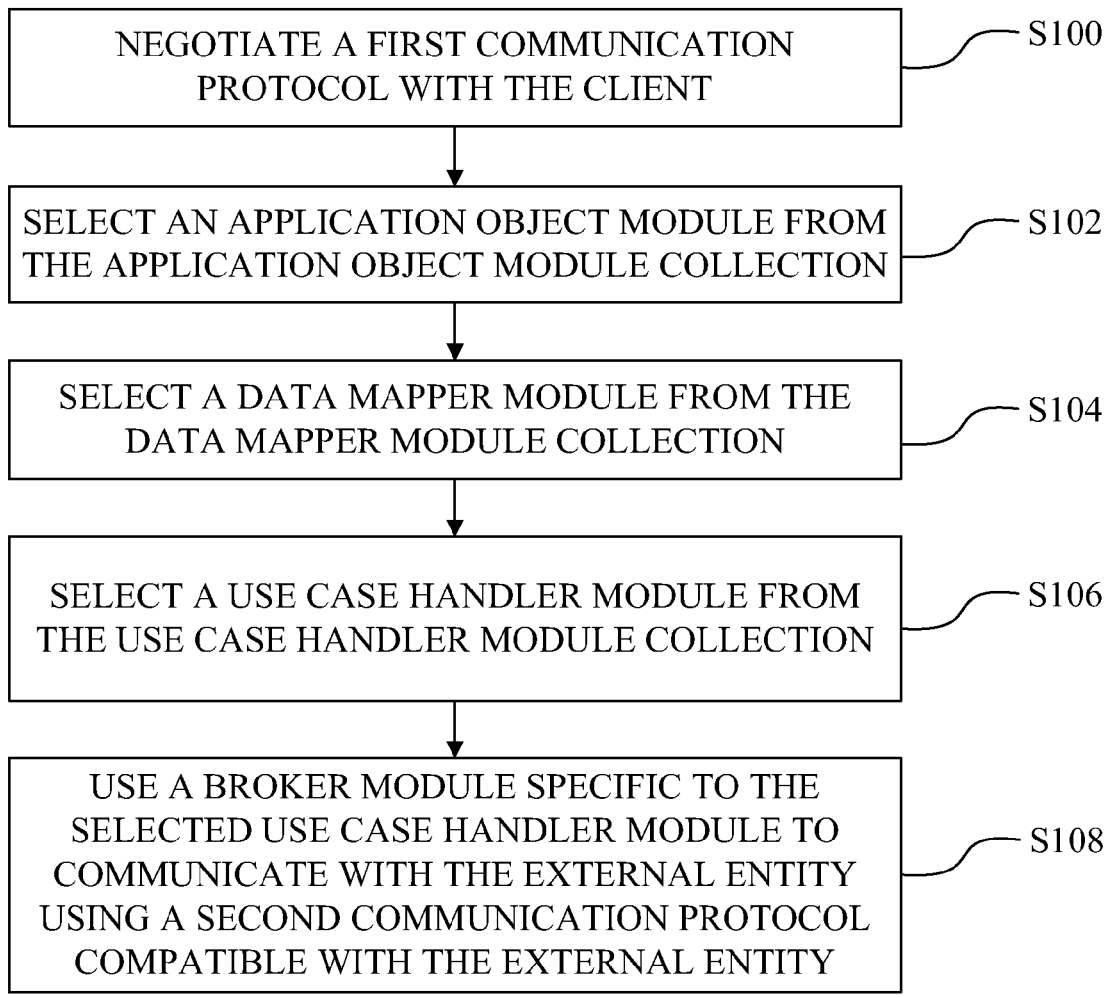
FIG. 4 is a flowchart of a method for establishing a communication translation interface for translating between a client and an external entity using the reusable application framework of FIG. 1.

The configuration of communication translation interface 60 will be described in relation to the flowchart of FIG. 4 depicting a method, i.e., process, for establishing a communication translation interface for translating between a client and an external entity using reusable application framework 10.

At step S100, the process negotiates a first communication protocol with the client. In this example, connection module 16-N was selected based a negotiation of the communication protocol with client 12-N, wherein connection module 16-N is configured to manage HTTP connections. Client 12-N is communicatively coupled to connection module 16-N by communications link 32-N. In this example, the communication protocol negotiated for communication between client 12-N and connection module 16-N is protocol B, e.g., HTML. As a result of the negotiation, it is determined that connection module 16-N is configured to receive an input request from client 12-N using the respective negotiated communication protocol B, and is configured to parse the input request to extract the client type identification and the use case identification. In this example, the client 12-N is requesting GPS data from external entity 14, and thus the client type identification is "Display of Client 12-N" and the use case identification is, "Get GPS Data."

At step S102, the process selects an application object module from the application object module collection 18. Based on the client type identification and the use case identification parsed from the respective input request, GPS application object module 18-2 is selected by application object collection manager module 20, and communications link 38-N is established between connection module 16-N and GPS application object module 18-2.

At step S104, the process selects a data mapper module from the data mapper module collection 22. GPS data mapper module 22-2 of data mapper module collection 22 is specific to the client type identification of client 12-N, and thus was selected for use in this example by data mapper collection manager module 24. GPS application object module 18-2 is communicatively coupled to GPS data mapper module 22-2 via communications link 40.

GPS data mapper module 22-2 is configured to extract input data from the input request supplied by client 12-N, and is configured to map the respective input data to a respective input bean of a predetermined data format, i.e., a standard data format, which in some cases may be a proprietary data format. Further, GPS data mapper module 22-2 is configured to send its respective input bean to GPS application object module 18-2 via communications link 40, or alternatively, its respective input bean may be sent directly to GPS use case handler module 26-2 via communications link 48.

At step S106, the process selects a use case handler module from the use case handler module collection 26. GPS use case handler module 26-2 was selected by use case collection manager module 28 for use with GPS application object module 18-2 based on the use case identification, e.g., Get GPS Data, without regard to the client type identification, since the input bean is in a predetermined format and is no longer dependent on the communication protocol B used by client 12-N. The GPS use case handler module 26-2 so selected is coupled via communications link 46 to GPS application object module 18-2. GPS use case handler module 26-2 may be configured to receive the respective input bean from GPS application object module 18-2. GPS use case handler module 26-2 is specific to at least one predefined task associated with external entity 14, e.g., the retrieval of GPS data from external entity 14. Alternatively, GPS use case handler 26-2 may be configured to receive the input bean directly from GPS data mapper module 22-2 via communications link 48.

At step S108, the process uses a broker module specific to the selected use case handler module to communicate with external entity 14 using a second communication protocol compatible with external entity 14. In this example, GPS broker module 30-2 specific to GPS use case handler module 26-2 is used. GPS use case handler module 26-2 is communicatively coupled by communications link 54 to GPS broker module 30-2. GPS broker module 30-2 is communicatively coupled by communications link 56 to external entity 14.

At this stage, the configuration of communication translation interface 60 is complete.

GPS broker module 30-2 is configured to communicate with external entity 14 using the communication protocol C compatible with external entity 14. GPS broker module 30-2 is configured to receive the input bean from GPS use case handler module 26-2 and insert the input bean into a data stream of the communication protocol C for transfer to external entity 14. External entity 14 then receives the input bean and parses its contents to retrieve information to identify tasks to be performed, e.g., get GPS data, as set forth in the original input request sent by client 12-N, which in this example is to retrieve GPS data.

In a return path, GPS broker module 30-2 is configured to receive output data from external entity 14, wherein the output data is in a data stream of the communication protocol C compatible with external entity 14. The output data includes a client type identification, and may include a use case identification, in order to define the path from external entity 14 through application framework 10 to client 12-N. GPS broker module 30-2 is configured to send the output data, e.g., GPS data, to the specified GPS use case handler module 26-2. GPS use case handler module 26-2 also is configured to send the output data to the associated GPS data mapper module 22-2 via GPS application object module 18-2 and communications link 40. GPS data mapper module 22-2 is configured to map the output data to an output bean formatted for client 12-N. Further, in this example, GPS data mapper module 22-2 is configured to send the output bean to the GPS use case handler module 26-2 via communications link 48.

GPS use case handler module 26-2 is configured to send the output bean to GPS application object module 18-2. GPS application object module 18-2 is configured to receive the output bean and forward the output bean to respective GPS connection module 16-N coupled to client 12-N. GPS connection module 16-N is configured to insert the output bean into a data stream of the communication protocol B, e.g., HTML, compatible with client 12-N for transfer to client 12-N so as to display the retrieved GPS data.

The return path process as described above may be readily adapted to send particular output data to other clients 12-2 . . . 12-N based on the client identification and use case identification associated with the particular output data.

Thus, as demonstrated in the example of FIG. 3, the communication translation interface designer did not have to design a new communication interface from the beginning to accommodate communications between client 12-N and external entity 14, but rather, communications translation interface 60 was created automatically and seamlessly based on the universal nature of application framework 10.

Due to the universal nature of application framework 10, application framework 10 is easily expanded to accommodate new clients and/or new tasks to be performed. For example, and referring again to FIG. 1, if, in the previous example, one or more of an appropriate connection module, application object module, data mapper module and/or use case handler module was not currently available, then the designer need only design the particular module(s) that is/are missing, and insert the module(s) in the appropriate collection 18, 22, and/or 26 of application framework 10.

Figure 5:
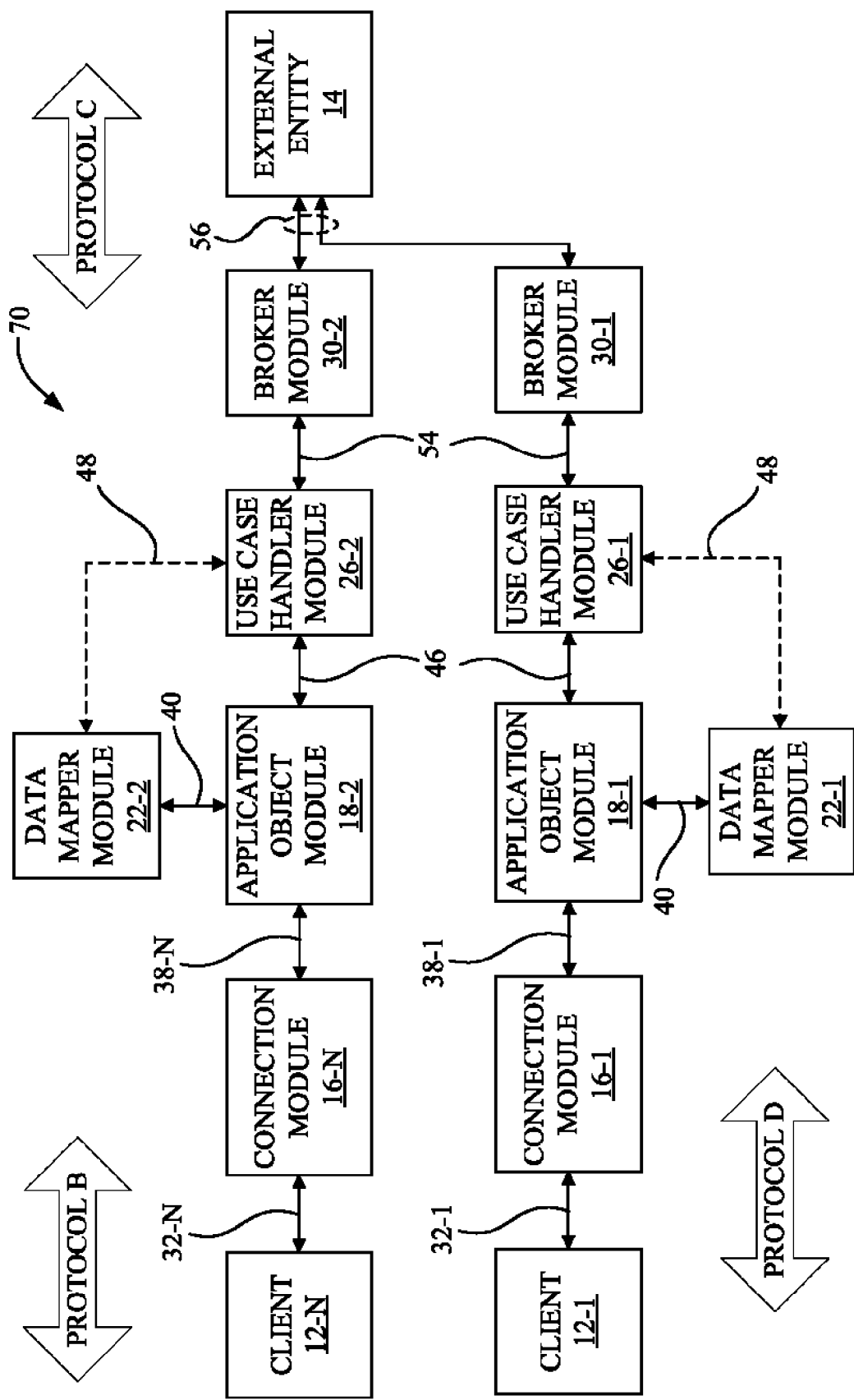
FIG. 5 is a diagrammatic representation of an exemplary configuration of another communication translation interface generated from the application framework of FIG. 1.

FIG. 5 is an exemplary configuration of a communication translation interface 70 generated from application framework 10, wherein application framework 10, as illustrated in FIG. 3, has been expanded to accommodate another client 12-1 that communicates using a communication protocol D. Because of the universal nature of application framework 10 as illustrated in FIG. 1, the process of the expansion of the configuration illustrated in FIG. 3 to accommodate communication between client 12-1 and external entity 14 will be the same as the process used in establishing the data interface between client 12-N and entity 14.

In this example, client 12-1 is communicatively coupled to connection module 16-1 by a respective communications link 32-1. Connection module 16-1 was selected based a negotiation of the communication protocol with client 12-1. In this example, the communication protocol negotiated for communication between client 12-1 and connection module 16-1 is protocol D. As a result of the negotiation, it is determined that connection module 16-1 is configured to receive an input request from client 12-1 using the respective negotiated communication protocol D, and is configured to parse the input request to extract the client type identification and the use case identification.

In summary, based on the client type identification and the use case identification parsed from the respective input request, application object module 18-1 is selected by application object collection manager module 20, and communications link 38-1 is established between connection module 16-1 and application object module 18-1. Data mapper module 22-1 of data mapper module collection 22 is specific to the client type identification of client 12-1, and thus was selected for use in this example by data mapper collection manager module 24. Data mapper module 22-1 is configured to extract input data from the input request supplied by client 12-1, and is configured to map the respective input data to a respective input bean of a predetermined data format. Use case handler module 26-1 was selected by use case collection manager module 28 for use with application object module 18-1 based on the use case identification, without regard to the client type identification, and receives the input bean generated by data mapper module 22-1. Broker module 30-1 is configured to communicate with external entity 14 using the communication protocol C compatible with external entity 14. Also, broker module 30-1 is configured to receive the input bean from use case handler module 26-1 and insert the input bean into a data stream of the communication protocol C for transfer to external entity 14. External entity 14 then receives the input bean and parses its contents to retrieve information to identify tasks to be performed as set forth in the original input request sent by client 12-1.

In a return path, broker module 30-1 is configured to receive output data in a data stream of the communication protocol C from external entity 14. The output data may include client type identification and a use case identification, in order to define the path from external entity 14 through application framework 10 to client 12-1. Broker module 30-1 is configured to send the output data to use case handler module 26-1. Use case handler module 26-1 also is configured to send the output data to the associated data mapper module 22-1 via application object module 18-1 and communications link 40. Data mapper module 22-1 is configured to map the output data to an output bean formatted for client 12-1. Further, in this example, data mapper module 22-1 is configured to send the output bean to the use case handler module 26-1 via communications link 48.

Use case handler module 26-1 is configured to send the output bean to application object module 18-1. Application object module 18-1 is configured to receive the output bean and forward the output bean to respective connection module 16-1 coupled to client 12-1. Connection module 16-1 is configured to insert the output bean into a data stream of the communication protocol D compatible with client 12-1 for transfer to client 12-1.

Thus, as demonstrated in the example of FIG. 5, application framework 10 is readily expandable to simultaneously accommodate multiple clients operating using different communication protocols in the communication with a common external entity. Also, those skilled in the art will recognize that application framework 10 may be easily adapted to simultaneously accommodate multiple external entities.

Having described the preferred embodiment, it will become apparent that various modifications can be made without departing from the scope of the invention as defined in the accompanying claims.

The invention claimed is:

1. A reusable application framework within a computer system for translating between a client and an external entity, said client and said external entity being incapable of direct communications, comprising:

a connection module configured for negotiating a first communication protocol with said client, said connection module being configured to receive an input request from said client using said first communication protocol, and configured to parse said input request to extract a client type identification and a use case identification;

an application object module specific to both of said client type identification and said use case identification, said application object module being coupled to said connection module and being configured for transferring said input request;

a data mapper module specific to said client type identification, said data mapper module being coupled to said application object module, said data mapper module being configured to extract input data from input requests having said client type identification, and being configured to map said input data to an input bean of a predetermined data format;

a use case handler module specific to at least one predefined task associated with said external entity, said use case handler module being coupled to said application object module, and configured to receive said input bean; and a broker module configured to communicate with said external entity using a second communication protocol compatible with said external entity, wherein said broker module is coupled to said use case handler module and is configured to receive said input bean from said use case handler module and insert said input bean into a data stream of said second communication protocol for transfer to said external entity.

2. The reusable application framework of claim 1, further comprising an application object collection manager module coupled to said connection module, said application object collection manager module being configured to select said application object module from a plurality of application object modules based on said client type identification and said use case identification.

3. The reusable application framework of claim 2, further comprising a mapper collection manager module coupled to each of said plurality of application object modules, said mapper collection manager module being configured to select said data mapper module from a plurality of data mapper modules based on said client type identification and said use case identification, each of said plurality of data mapper modules being configured to map extracted input data to a corresponding input bean of said predetermined data format.

4. The reusable application framework of claim 2, further comprising a use case collection manager module coupled to each of said plurality of application object modules, said use case collection manager module being configured to select said use case handler module from a plurality of use case handler modules based on said use case identification without regard to said client type identification, each of said plurality of use case handler modules being specific to at least one predefined task associated with said external entity.

5. The reusable application framework of claim 4, further comprising a plurality of broker modules, each of said plurality of broker modules being coupled to said external entity, and each of said plurality of broker modules being coupled to a respective one of said plurality of use case handler modules.

6. The reusable application framework of claim 1, wherein:
said broker module is configured to receive output data from said external entity, said broker module being configured to send said output data to said use case handler module, said use case handler module being configured to send said output data to said data mapper module;

said data mapper module being configured to map said output data to an output bean formatted for said client, and configured to send said output bean to said use case handler module, said use case handler module being configured to send said output bean to said application object module, said application object module being configured to receive said output bean and forward said output bean to said connection module; and said connection module being configured to insert said output bean into a data stream of said first communication protocol for transfer to said client.

7. The reusable application framework of claim 1, wherein said first communication protocol is one of Hyper Text Transfer Protocol (HTTP), User Datagram Protocol (UDP) and transmission control protocol (TCP), different from said second communication protocol.

8. The reusable application framework of claim 1, wherein said second communication protocol is one of Hyper Text Transfer Protocol (HTTP), User Datagram Protocol (UDP) and transmission control protocol (TCP), different from said first communication protocol.

9. The reusable application framework of claim 1, wherein each application object module of said plurality of application object modules is associated with a respective specific application of a plurality of applications and used for manipulating said respective specific application.

10. The reusable application framework of claim 9, wherein said plurality of applications include at least two of a GPS application, a vehicle guidance application, a weapons system application, and a spreadsheet application.

11. A reusable application framework within a computer system for translating between a client and a external entity, said client communicating using a first communication protocol and said external entity communicating using a second communication protocol different from said first communication protocol, comprising:

a first connection module coupled to said client, said first connection module receiving an input request from said client and parsing said request to extract a first client type identification and a first use case identification;

an application object module collection having a plurality of application object modules, said application object module collection being coupled to said first connection module;

an application object collection manager module coupled to said first connection module and to said application object module collection, said application object collection manager module being configured to select a first application object module of said plurality of application object modules based on said client type identification and said use case identification;

a data mapper module collection including a plurality of data mapper modules, said data mapper module collection being coupled to said application object module collection, each data mapper module of said plurality of data mapper modules being configured to extract input data from input requests having a particular client type identification, and being configured to map said input data from said particular client type to an input bean of a common data representation;

a data mapper collection manager module coupled to said data mapper module collection, said data mapper collection manager module being configured to select a first data mapper module of said plurality of data mapper modules based on said client type identification and said use case identification;

a use case handler module collection including a plurality of use case handler modules, said use case handler module collection being coupled to said application object module collection, each use case handler module being coupled to a particular data mapper module having the same client type identification, each use case handler module being specific to at least one predefined task associated with said external entity;

a use case collection manager module coupled to said application object module collection and to said use case handler module collection, said use case collection manager module being configured to select a first use case handler module of said plurality of use case handler modules based on said use case identification without regard to said client type identification;

said first use case handler module being specific to a first task associated with said external entity, said first use case handler module being coupled to said first data mapper module, said first use case handler module being configured to receive said input bean; and a first broker module specific to said first use case handler module that is configured to communicate with said external entity using said second communication protocol, wherein said first broker module coupled to said first use case handler module is configured to receive said input bean from said first use case handler module and forward said input bean to said external entity using said second communication protocol.

12. The reusable application framework of claim 11, wherein:

said first broker module is configured to receive output data from said external entity, said first broker module being configured to send said output data to said first use case handler module, said first use case handler module being configured to send said output data to said first data mapper module;

said first data mapper module being configured to map said output data to an output bean formatted for said client, and configured to send said output bean to said first use case handler module, said first use case handler module being configured to send said output bean to said first application object module, said first application object module being configured to receive said output bean and forward said output bean to said first connection module; and said first connection module being configured to insert said output bean into a data stream of said first communication protocol for transfer to said client.

13. The reusable application framework of claim 11, wherein said first communication protocol is one of Hyper Text Transfer Protocol (HTTP), User Datagram Protocol (UDP) and transmission control protocol (TCP), different from said second communication protocol.

14. The reusable application framework of claim 11, wherein said second communication protocol is one of Hyper Text Transfer Protocol (HTTP), User Datagram Protocol (UDP) and transmission control protocol (TCP), different from said first communication protocol.

15. The reusable application framework of claim 11, wherein each application object module of said plurality of application object modules is associated with a respective specific application of a plurality of applications and used for manipulating said respective specific application.

16. The reusable application framework of claim 15, wherein said plurality of applications include at least two of a GPS application, a vehicle guidance application, a weapons system application, and a spreadsheet application.

17. A computer-implemented method for establishing a communication translation interface for translating between a client and an external entity using a reusable application framework, comprising:

providing each of an application object module collection having a plurality of application object modules, a data mapper module collection including a plurality of data mapper modules, and a use case handler module collection including a plurality of use case handler modules;

negotiating a first communication protocol with said client using a connection module, said connection module being configured to receive an input request from said client using said first communication protocol, and configured to parse said input request to extract a client type identification and a use case identification;

selecting an application object module from said application object module collection that is specific to both of said client type identification and said use case identification, said application object module being coupled to said connection module and being configured for transferring said input request;

selecting a data mapper module from said data mapper module collection that is specific to said client type identification, said data mapper module being coupled to said application object module, said data mapper module being configured to extract input data from input requests having said client type identification, and being configured to map said input data to an input bean of a predetermined data format;

selecting a use case handler module from said use case handler module collection that is specific to at least one predefined task associated with said external entity, said use case handler module being configured to receive said input bean; and using a broker module specific to the selected use case handler to communicate with said external entity using a second communication protocol compatible with said external entity, wherein said broker module is configured to receive said input bean from said use case handler module and insert said input bean into a data stream of said second communication protocol for transfer to said external entity.

18. The method of claim 17, wherein said first communication protocol is one of Hyper Text Transfer Protocol (HTTP), User Datagram Protocol (UDP) and transmission control protocol (TCP), different from said second communication protocol.

19. The method of claim 17, wherein said second communication protocol is one of Hyper Text Transfer Protocol (HTTP), User Datagram Protocol (UDP) and transmission control protocol (TCP), different from said first communication protocol.

20. The method of claim 17, wherein each application object module of said plurality of application object modules is associated with a respective specific application of a plurality of applications and used for manipulating said respective specific application.

* * * * *